Patented July 20, 1926.

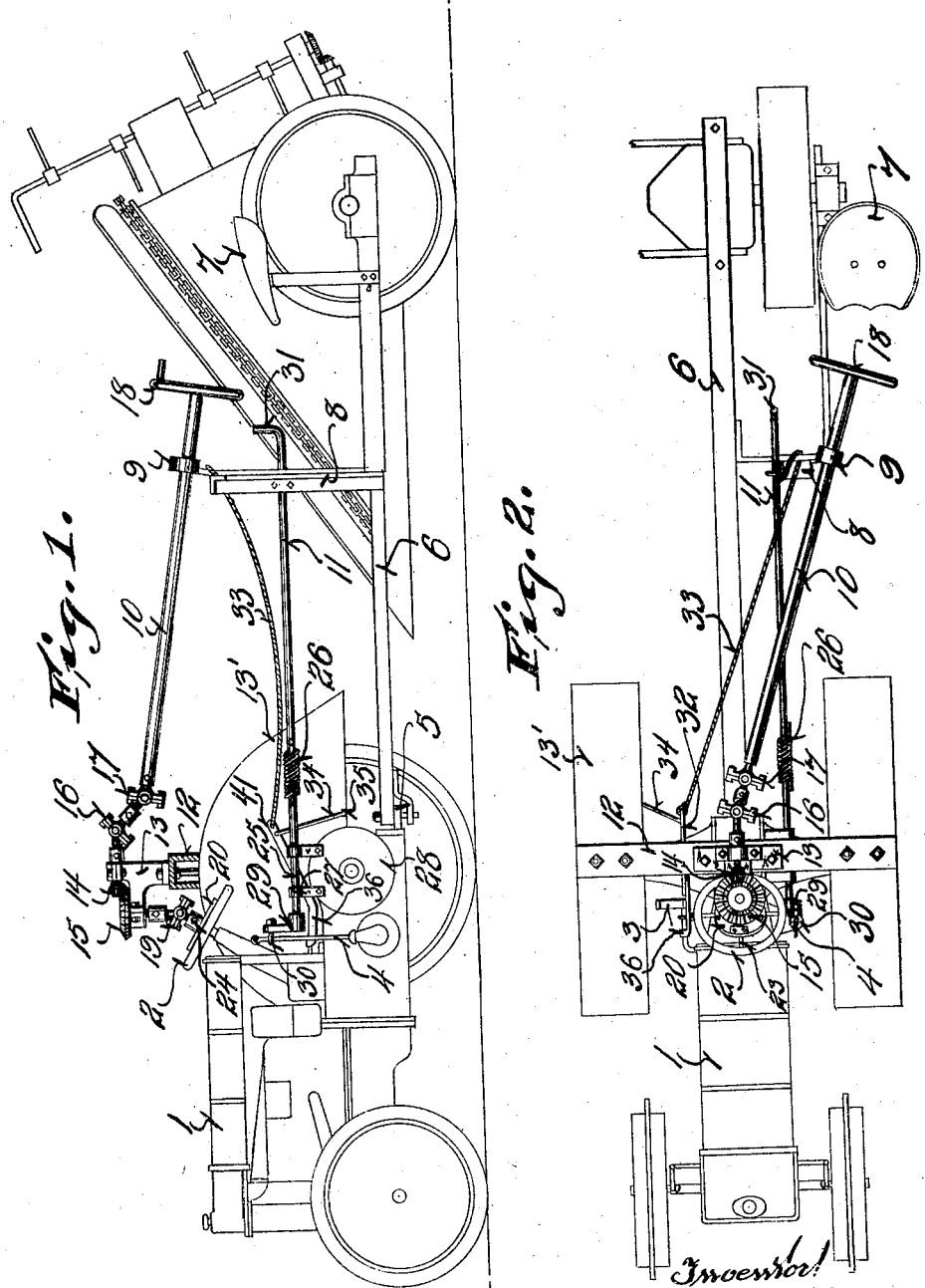

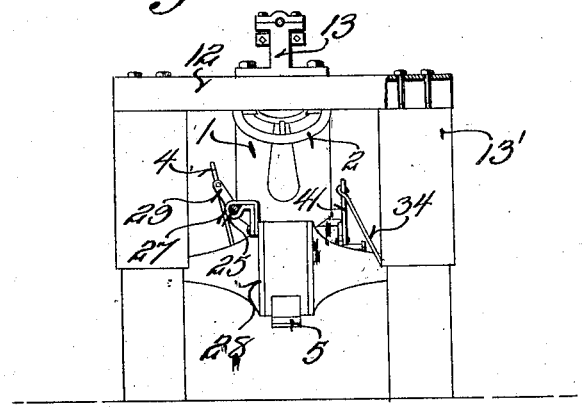
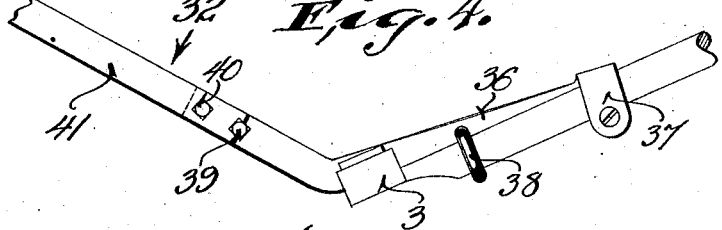
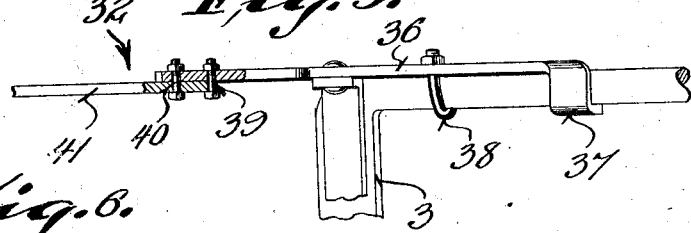
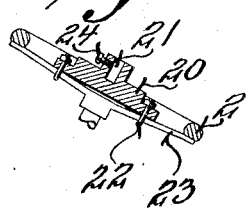

1,593,270

UNITED STATES PATENT OFFICE.

FRANK SCHAEFER, OF NEOSHO, WISCONSIN.

ATTACHMENT FOR TRACTORS.

Application filed December 22, 1924. Serial No. 757,492.

This invention relates to attachments for tractors and is particularly directed to an attachment to be operated by one man.

Objects of this invention are to provide an attachment for a tractor which is so constructed that the driver may sit in the seat of the attachment, such as a binder, for instance, and may guide the tractor, may control the clutch and may operate the shift gear from the implement or attachment seat.

Further objects are to provide an attachment for a tractor which will adapt itself to curves or irregularities in the ground without affecting the control of the tractor, and without producing undue stresses in any part of the mechanism.

An embodiment of the invention is shown in the accompanying drawings, in which:—

Figure 1 is a side view of the tractor showing the device in place, one of the rear wheels of the tractor being omitted in such view for the sake of clearness and certain parts being in section.

Figure 2 is a plan view of the structure shown in Figure 1.

Figure 3 is a rear elevation of the tractor with the attachment detached therefrom.

Figure 4 is a side elevation of the clutch pedal attachment.

Figure 5 is a plan view of the structure shown in Figure 4.

Figure 6 is a sectional view through the steering wheel showing the casting attached thereto when it is in place.

Referring to Figures 1 and 2, it will be seen that a standard tractor 1 is employed, and this tractor is provided with a steering wheel 2, a clutch lever 3 and a shift lever 4, and a traction ear 5, in the usual manner.

The attachment may consist of any suitable implement such for instance as the binder shown in the drawings, and such attachment, when hereinafter referred to as a binder, will be understood as indicating any desired attachment. This binder is provided with a longitudinal draft pole or rod 6. This draft pole or rod extends to a rear portion of the implement and transmits the traction to such implement. The binder is provided with an operator's seat and with upwardly extending braces 8 which carries suitable bearings 9 for the extension steering shaft 10 and for the shift rod 11. In adapting the tractor to remote control, a channel bar 12 is bolted to the rear fender 13' and extends across the machine adjacent the steering wheel 2. This channel member carries a bracket 13 which receives the shaft of a small pinion 14 extending rearwardly and the shaft of a large gear 15 extending vertically. The rearwardly extending shaft of the pinion 14 is connected by means of universal joints 16 and 17 with the extension steering shaft 10 so that the steering motion of the hand wheel 18, located adjacent the implement seat 7, may be transmitted to the big gear 15. The big gear 15 is connected by means of a universal joint 19 with a casting 20 secured to the hand wheel 2, as more clearly shown in Figure 6. The casting 20 is provided with a socket 21 adapted to receive the shaft from the universal joint 19, such shaft being locked in place by means of a set screw 24 illustrated in Figure 6.

The casting 20 is secured to the steering wheel 2 by means of U-bolts or hook bolts 22 which pass through the casting and around the spokes of the steering wheel thus providing a very rigid and secure attachment for the steering wheel.

In this connection it is to be noted that when the device is detached it is merely necessary to loosen the set screw 24 (see Figure 6) and permit the shaft of the universal joint 19 to be slipped from the casting 20. The casting 20 or fitting may be left upon the hand wheel without interference with its normal use.

The shift rod 11 for the shift lever 4 is provided with a forward portion 25 which is connected to the rear portion 11 by means of a tightly twisted spring 26 to provide flexibility and permit the free adapting of the apparatus to turns and irregularities in the ground. The portion 25 of the shift rod is carried by means of a pair of brackets 27 bolted to the rear axle housing 28, as shown clearly in Figure 1. The forward end of the shift rod is provided with a crank arm 29 which receives an eye bolt 30. This eye bolt slidably receives the shift lever 4 and thus provides an operative attachment between the crank arm 29 and such shift lever.

The operation of the shift mechanism will be readily understood. For example forward and rear motion of the lever 4 may be easily secured by sliding the rod 11 forwardly and rearwardly, such rod being provided with a rear manipulating handle 31. Also the shift lever 4 may be rocked inwardly and outwardly by rocking the handle 31.

An extension, indicated generally at 32, is bolted to the clutch lever 3, as shown in Figures 2, 4 and 5. This extension is provided with a rope 33 which extends to a point adjacent the seat of the implement. Thus by pulling rearwardly upon the rope, the clutch pedal may be depressed and release of the rope will permit rising of the pedal. It is found desirable in this connection to provide an arm or link 34 freely pivoted to the extension lever 32. This arm is provided with a hooked end adapted to be fastened temporarily beneath the lower edge of the mud guards 13' or protecting shields for the rear wheels, as shown clearly in Figures 1, 2 and 3. If desired, a notch 35, as shown in Figure 1, may be provided in the mud guard 13 into which the hooked end of the link 34 may be positioned and may thus be prevented from slipping.

This is merely a safety device and is adapted to hold the clutch pedal depressed for an indefinite period whenever desired. In order to provide free and quick detachment the main body of the extension from the clutch lever 3, such extension, indicated generally at 32 in Figures 4 and 5, is provided with a main part 36 which is secured by means of an ear 37, and a hook bolt 38 to the clutch pedal lever, as clearly shown in Figure 4. This portion of the extension projects rearwardly a slight distance and carries a pair of bolts 39 and 40. The attachment is provided with a rear extension 41 which is apertured to receive the bolt 40, and which is notched to receive the bolt 39. Due to this construction, it is merely necessary to remove the one bolt 40 and to loosen the other bolt when it is desired to remove the extension 41. The slight projection of the main portion 36 is not in the way of the operator and does no harm and, therefore, may be left in place.

It will be seen, therefore, that a very simple and easily operated one man attachment has been provided for a tractor. It will further be seen that the operator may remain in the seat of the attachment and may most easily control the tractor from such seat.

It will further be seen that the device is jointed and will accommodate itself to curves and irregularities in the ground without affecting the control of the tractor. It will be noted further that the device may be most readily detached from the tractor without affecting the use of the tractor in its usual capacity. This is most easily effected by loosening the screw 24 (see Figure 6) and withdrawing the shaft of the universal joint 19. If desired the transverse channel member 12 may be removed from the mud guards and the brackets 27 removed from the rear axle cover 28. The eye bolt 30 is detached from the rock arm 29 and merely slides downwardly on the shift lever and remains out of the way. Also the extension 41 from the clutch pedal may be easily removed by removing the bolt 40, as may be seen from Figure 5. Thus the tractor may be quickly changed back to its normal condition ready for the usual operation for which it is desired.

It is to be noted further that the attachment is extremely simple, positive in its operation and is not likely to get out of order.

Although the invention has been described in considerable detail, it is to be understood that the invention may be variously embodied and is, therefore, to be limited only as claimed.

I claim:—

1. The combination of a tractor provided with steering mechanism and a wheeled attachment adapted to be drawn thereby, said attachment having a bearing and an extension shaft carried by said bearing and provided with a hand wheel, a bracket adapted for attachment to said tractor and having a substantially horizontal and a substantially vertical bearing therein, a shaft in each of said bearings, gears connecting said shafts, a universal joint connecting the substantially horizontal shaft with said extension shaft, and a universal joint between the substantially vertical shaft and the steering mechanism.

2. An attachment adapted to be applied to a tractor comprising a transverse member for attachment to the tractor, a bracket carried thereby and having a vertical bearing and a horizontal bearing, a vertical shaft and a horizontal shaft carried respectively in said bearings and joined by gearing, a universal joint extending from said horizontal shaft, an extension shaft joined to said universal joint and provided with a hand wheel, a universal joint carried by said vertical shaft and having means carried at its lower end for attachment to the steering wheel of the tractor.

3. The combination of a tractor having a pair of rear fenders and having a hand wheel, a transverse bar carried by said rear fenders, a bracket bolted to said transverse bar and having a forwardly extending portion provided with a vertical bearing and having a horizontal bearing, a vertical shaft and a horizontal shaft carried by said bearing and joined by a pair of gear wheels, an attachment secured to said hand wheel and joined by a universal joint to the lower end of said vertical shaft, an implement attached rearwardly of said tractor and having a bearing therein, an extension shaft carried within such last mentioned bearing and provided with a hand wheel at its rear end, and a universal joint joining the forward end of said extension shaft with said horizontal shaft.

In testimony that I claim the foregoing I have hereunto set my hand at Neosho, in the county of Dodge and State of Wisconsin.

FRANK SCHAEFER.